United States Patent [19]

Fujiwara et al.

[11] Patent Number: 4,571,652
[45] Date of Patent: Feb. 18, 1986

[54] MAGNETIC RECORDING AND REPRODUCING APPARATUS

[75] Inventors: Hideo Fujiwara, Tokorozawa; Shigekazu Otomo, Sayama; Kiminari Shinagawa, Kanagawa; Noriyuki Kumasaka, Ome; Takeo Yamashita, Hachioji; Mitsuhiro Kudo, Tokyo; Teizo Tamura, Katsuta, all of Japan

[73] Assignee: Hitachi, Ltd., Tokyo, Japan

[21] Appl. No.: 444,224

[22] Filed: Nov. 24, 1982

[30] Foreign Application Priority Data

Nov. 27, 1981 [JP] Japan .................. 56-189330

[51] Int. Cl.$^4$ .................................. G11B 5/22
[52] U.S. Cl. ........................ 360/122; 360/125
[58] Field of Search ................ 360/125–127, 360/122, 119; 29/603

[56] References Cited

U.S. PATENT DOCUMENTS

| | | | |
|---|---|---|---|
| 3,810,245 | 5/1974 | Ozawa et al. | 360/127 |
| 3,931,642 | 1/1976 | Kugimija et al. | 360/122 X |
| 4,246,619 | 1/1981 | Hirai et al. | 360/125 |
| 4,450,494 | 5/1984 | Fujiwara et al. | 360/125 |

FOREIGN PATENT DOCUMENTS

| | | | |
|---|---|---|---|
| 043560 | 11/1978 | Japan | 360/125 |
| 56-41519 | 4/1981 | Japan | 360/122 |
| 57-55522 | 4/1982 | Japan | 360/122 |

*Primary Examiner*—John H. Wolff
*Attorney, Agent, or Firm*—Antonelli, Terry & Wands

[57] ABSTRACT

A magnetic recording and reproducing apparatus comprises a magnetic head having magnetic cores in which at least portions thereof in the vicinity of a gap are made of $M_n$-$Z_n$ ferrite single crystal and planes of the magnetic cores forming a principal magnetic circuit are formed by {110} planes of the ferrite and <100> directions contained in the {110} planes are inclined to a surface facing a magnetic recording medium, and means for relatively moving the magnetic recording medium in an opposite and parallel direction to a projection vector on said surface facing said recording medium, of a vector directed from a site far from the surface facing the magnetic recording medium to a site near said surface in the <100> direction projected on the surface facing the magnetic recording medium. The present magnetic recording and reproducing apparatus exhibits both high wear resistance and excellent read/write characteristic.

16 Claims, 19 Drawing Figures

MAGNETIC RECORDING AND REPRODUCING APPARATUS

The present invention relates to a magnetic recording and reproducing apparatus having a magnetic head which uses $M_n$-$Z_n$ ferrite single crystal in a portion of or an entire magnetic core, and more particularly to a magnetic recording and reproducing apparatus which effectively mounts a wear resistive and high performance head.

Figure 1:
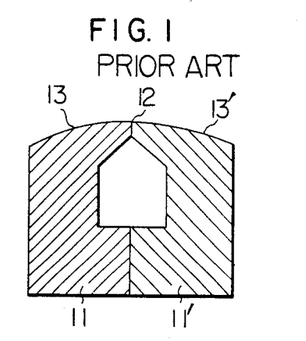
FIGS. 1 and 2 show schematic sectional views of prior art ferrite magnetic heads.
Figure 2:
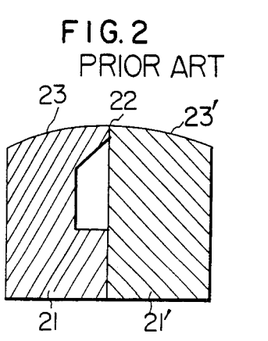

It has been well known that read/write characteristics and a wear resistance of a magnetic head which uses $M_n$-$Z_n$ ferrite single crystal as a magnetic core greatly depend on an orientation of the ferrite single crystal which forms the magnetic core. Thus, a crystalline orientation is selected depending on a purpose intended, and as shown in sectional views of FIGS. 1 and 2, a magnetic head, in most cases, comprises a magnetic core which includes a pair of C-shaped core halves 11 and 11', or a C-shaped core half 21 and an I-shaped core half 21' bonded together with an gap 12 or 22 being interleaved therebetween. A magnetic head having its surfaces 13, 13', 23, 23' facing a magnetic recording medium formed with a {110} plane or {100} plane has been well-known as a magnetic head having a high wear resistance.

Figure 3:
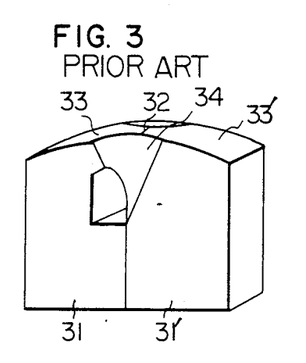
FIG. 3 shows a schematic perspective view of other prior art magnetic head.
Figure 4:
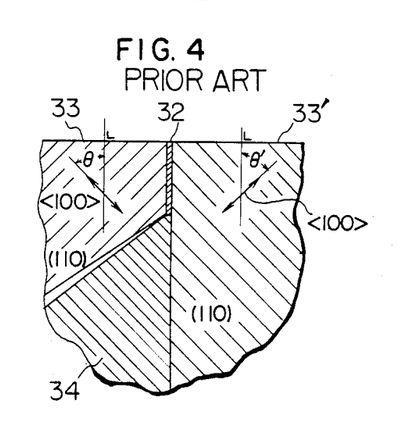
FIG. 4 shows a partial sectional view, in the vicinity of a gap, of the magnetic head shown in FIG. 3.

As shown schematically in FIG. 3, in a magnetic head in which at least one of magnetic core halves 31 and 31' made of single crystal $M_n$-$Z_n$ ferrite, and glass 34 having a contraction rate lower than that of the ferrite when a temperature is lowered from a glass setting temperature to a room temperature is fused and deposited to a side plane of the core in the vicinity of a gap 32, it has been known that an excellent read/write characteristic is attained by forming the side plane of the $M_n$-$Z_n$ ferrite core, that is, a plane forming a principal magnetic circuit with a {110}plane and setting an angle ($\theta$ and/or $\theta'$ shown in FIG. 4) between a <100> direction in the {110} plane and a direction normal to a surface facing a magnetic recording medium to 5°–40° or 80°–120° (Japanese Laid-Open Patent Application No. 125519/80). In a magnetic head shown schematically in FIG. 5 having a magnetic core in which a pair of single crystal $M_n$-$Z_n$ ferrites face to each other such that crystalline orientation is symmetric with respect to a gap and side planes of the core is substantially parallel to a {110} plane, it has been known that a relatively high wear resistance and an excellent read/write characteristic are attained by polishing the side planes 55 and 55' of the core and leaving strains caused thereby, and setting angles $\phi$ and $\phi'$ between a <110> direction in the {110} plane and surfaces 53 and 53' facing to a magnetic recording medium to 35°, respectively (Japanese Laid-Open Patent Application No. 96012/78). The inventors of the present invention have proposed that a magnetic head having excellent read/write characteristics and a high wear resistance is provided by forming at least a portion of a C-shaped core half which is in the vicinity of a gap by a magnetic material exhbiting a magnetic anisotropy, orienting an axis of magnetic anisotropy of the magnetic material such that excellent read/write characteristic are provided and selecting a material and/or crystalline orientation of at least a portion of an I-shaped core half facing a magnetic recording medium such that it has a wear resistance rather than it exhibits excellent read/write characteristics, based on the finding that the read/write characteristics of a magnetic head composed of I-shaped and C-shaped core halves in which at least the portions in the vicinity of the gap are made of the magnetic material exhibiting the magnetic anisotropy are much more affected by the orientation of the axis of anisotropy in the C-shaped core half than that in the I-shpaed core half (This is disclosed in Japanese Laid-Open Patent Application No. 76561/81 which is a senior application to the present application but not publicly known prior to the present application). The above application discloses that a magnetic head of the excellent read/write characteristics is attained by forming at least a portion of the C-shaped core half which is in the vicinity of the gap with the $M_n$-$Z_n$ ferrite single crystal, forming the side plane of the $M_n$-$Z_n$ ferrite single crystal core, that is, a plane forming a principal magnetic circuit with a {110} plane, setting an angle $\theta$ between a <100> direction in the {110} plane and a direction normal to the surface facing the magnetic recording medium to 5°–40° or 80°– 120°, and forming an appropriate strain in the vicinity of the gap.

The following references are cited to show the state of art:

(i) Japanese Laid-Open Patent Application No. 96012/79,
(ii) Japanese laid-Open Patent Application No. 125519/80, and
(iii) E. Hirota and K. Kugimiya; Ferrites for Magnetic Recording Heads, National Technical Report, Vol. 22, No. 6 (December 1976), pages 753–773 (particularly pages 758–760).

It is an object of the present invention to provide a magnetic recording and reproducing apparatus having improved wear resistance and read/write characteristic.

Figures 5, 6:
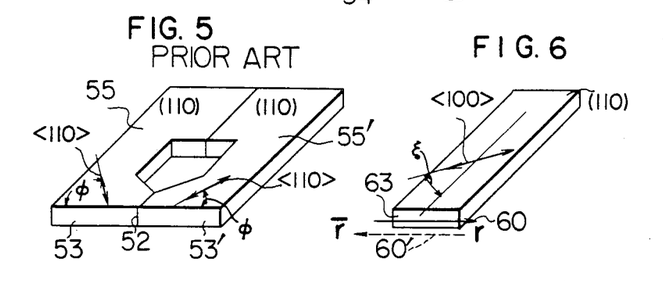
FIG. 5 shows a schematic perspective view of a further prior art magnetic head.
FIG. 6 shows a perspective view of an elongated rectangular ferrite sample for use in a wear rate test.
Figure 7:
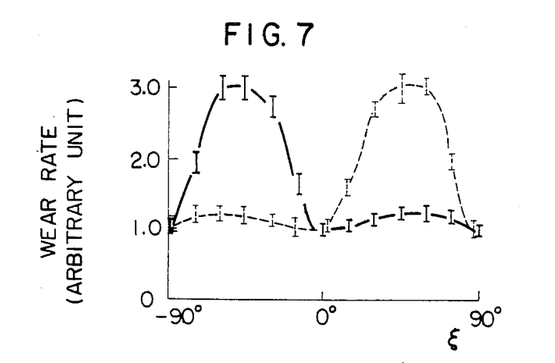
FIG. 7 shows a diagram illustrating a depending of the wear rate of the sample shown in FIG. 6 to a crystalline orientation.
Figure 8A:
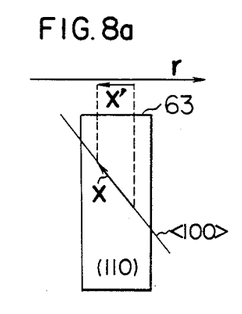
FIGS. 8a and 8b show side views of the ferrite sample for illustrating the dependency of the wear rate on the sliding direction.
Figure 8B:
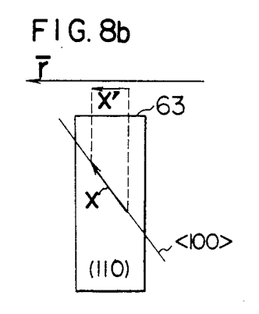

The present invention was made based on the novel finding of the inventors of the present invention in the course of detailed investigation of wear properties of the $M_n$-$Z_n$ ferrite single crystal. More specifically, an elongated rectangular sample as shown in FIG. 6 was stamped out from a $M_n$-$Z_n$ ferrite single crystal this plate with upper and lower surfaces thereof having plane indices of (110), and an angle $\epsilon$ between the <100> direction in the (110) plane and a direction perpendicular to an end plane 63 in a longitudinal direction of the sample was changed and a wear rate of the end plane 63 due to the sliding to a magnetic tape was measured. As a result, it was found that the dependency of the wear rate on the angle $\epsilon$ when the tape was slid on the end plane in a direction 60 shown by a solid line vector (r) and inversely when the tape was slid in a direction 60' shown by a broken line vector (r̄) were significantly different as shown by a solid line (for the vector r 60) and a broken line (for the vector r̄ 60') in FIG. 7. This fact indicates that the wear resistance is higher when the sliding direction vector r of the magnetic tape is antiparallel (opposite direction) to a projection vector x' in the sliding direction of a vector x in the <100> direction taken in the direction going from a site far from the surface facing the magnetic recording medium to a site near the surface as shown in FIG. 8a than when the sliding direction vector r is parallel (same direction) to the projection vector x'.

Accordingly, the magnetic head of the magnetic recording and reproducing apparatus of the present invention has magnetic core members which face each other to form a gap on a surface facing a magnetic recording medium and at least a portion of at least one of the magnetic core members which is in the vicinity of the gap is made of a single crystal $M_n$-$Z_n$ ferrite, and a plane forming a principal magnetic circuit of the head in at least one of the single crystal $M_n$-$Z_n$ ferrites is formed by a substantially {110} plane of the signle crystal ferrite, and a <100> direction in the {110} plane is oblique to the surface facing the magnetic recording medium. When a plurality of such single crystal $M_n$-$Z_n$ ferrites having the oblique <100> directions are included, each of the oblique <100> directions is oblique to the surface facing the magnetic recording medium in the same direction. The magnetic recording and reproducing apparatus of the present invention further includes means for relatively moving the magnetic recording medium such that a projection vector on the surface facing the magnetic recording medium, of a vector taken in a direction going from a site far from the surface facing the magnetic recording medium to a site near the surface in the <100> direction is anti-parallel to the sliding direction vector.

The present invention will be apparent from the following detailed description taken in conjunction with the accompanying drawings, in which.

Figure 9:
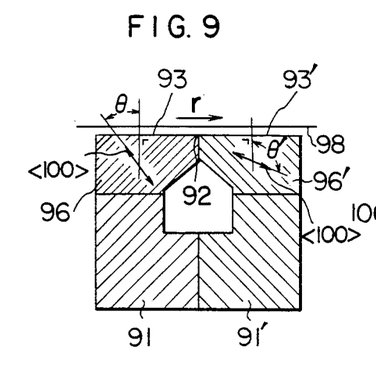
FIG. 9 shows a sectional view of one embodiment of the magnetic recording and reproducing apparatus of the present invention.

In one preferred form of the magnetic head of the present invention, a pair of core halves 91 and 91' are joined together with a gap 92 being interleaved therebetween as shown by a schematic sectional view of FIG. 9, at least portions of the core halves which are in the vicinity of the gap are made of $M_n$-$Z_n$ ferrite single crystals, planes forming a principal magnetic circuit in the single crystals 96 and 96' are formed by substantially {110} planes, angles $\theta$ and $\theta'$ between <100> axes in the {110} planes and directions normal to surfaces 93 and 93' facing a magnetic recording medium are set to 5°–40° or 80°–85° and 95°–120°, respectively, so that the oblique <100> directions in the vicinity of the gap of the core halves are oblique to the surfaces facing the magnetic recording medium in the same direction, and the angles $\theta$ and $\theta'$ are restricted to the above ranges so that excellent read/write characteristics are assured. It should be understood that the core halves may be constructed by a single single-crystal $M_n$-$Z_n$ ferrite. In that case, the gaps 96 and 96' need not be specifically illustrated. The magnetic recording and reproducing apparatus of the present invention which uses this head has means for relatively sliding the magnetic recording medium 98 in a direction of a vector r. This sliding means may move the recording medium or may rotate the head to move the head so that the recording medium is relatively moved in the direction of the vector 4.

Figure 10:
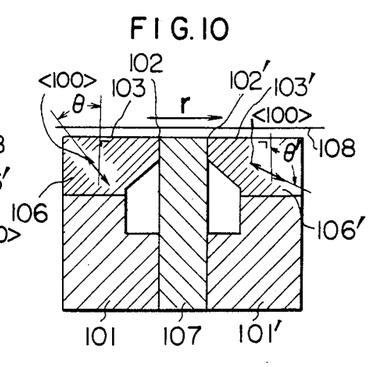
FIG. 10 shows a sectional view of another embodiment of the magnetic recording and reproducing apparatus of the present invention.

In another form of the magnetic head in the magnetic recording and reproducing apparatus of the present invention, a magnetic core comprises, as shown by a schematic sectional view of FIG. 10, an I-shaped core member 107 and C-shaped core members 101 and 101' joined thereto on opposite sides thereof with gaps 102 and 102' being interleaved therebetween, and at least portions of the C-shaped core members which are in the vicinity of the gaps are made of $M_n$-$Z_n$ ferrite single crystals, planes in the single crystals 106 and 106' which form a principal magnetic circuit are formed by substantially {110} planes, angles $\theta$ and $\theta'$ between <100> directions in the {110} planes and directions normal to surfaces facing the magnetic recording medium are set to 5°–40° or 80°–85° and 95°–120°, respectively, so that the oblique <100> directions in the vicinity of the gaps of the C-shaped members are oblique to the surfaces 103 and 103' facing the magnetic recording medium in the same direction, and the angles $\theta$ and $\theta'$ are restricted to the above ranges so that excellent read/write characteristics are assured. Of the magnetic heads described above, one of the most preferrable forms is that in which the I-shaped core member is made of the $M_n$-$Z_n$ ferrite single crystal, and the surface of the I-shaped core member facing the magnetic recording medium is formed by the {100} or {110} plane or similar plane so that the wear resistance is assured. Like the previous case, the C-shaped core members may be constructed by a single integral single crystal $M_n$-$Z_n$ ferrite. In that case, the portions 106 and 106' near the gaps need not be specifically illustrated. The magnetic recording and reproducing apparatus of the present invention which uses this head has means for relatively sliding the magnetic recording medium 108 in the direction of the vector r.

A magnetic head structure in which one of the C-shaped core members 101 and 101' of the magnetic head shown in FIG. 10 is omitted and one C-shaped core member (101 or 101') and one I-shaped core member are combined is also suitable to the magnetic recording and reproducing apparatus of the present invention.

When at least a portion of the I-shaped core member of the magnetic head shown in FIG. 10 which is in the vicinity of the gap is made of the single crystal $M_n$-$Z_n$ ferrite, the {110} plane thereof is made substantially parallel to the plane forming the principal magnetic circuit and the <100> direction in the {110} plane is inclined to the surface facing the magnetic recording medium in the same direction as the C-shaped core member so that the magnetic recording and reproducing apparatus having a high wear resistance and excellent read/write characteristics is provided.

Preferrable ranges of the angles θ and θ' are 10°–35° and 95°–115°, respectively, more preferable ranges are 20°–30° and 95°–105°, respectively, and most preferable angles are 25° and 100°, respectively. When the angle θ or θ' is beyond the range 5°–40° or 80°–120°, the read/write characteristics of the magnetic head are degraded, and when it is within a range of 85°–95°, the improvement of the wear resistance by specifying the sliding direction of the magnetic recording medium is small. Accordingly, the angles θ and θ' in the present invention are 5°–40° or 80°–85° and 95°–120°, respectively. Since the <100> directions are oblique in the same direction to the surfaces of the magneitc core members facing the magnetic recording medium the combination of the angles θ and θ' is selected as shown above. When only one single crystal $M_n$-$Z_n$ ferrite having the {110} plane which is substantially parallel to the plane forming the principal magnetic circuit is used, it is not necessary to consider the combination of the angles θ and θ' and the angle θ may be set to 5°–40°, 80°–85° or 95°–120°.

It is apparent that the angles θ and θ' may be exchanged with each other.

Figure 11:
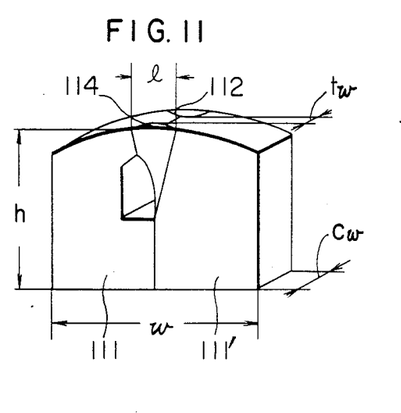
FIG. 11 shows a schematic perspective view of a magnetic head in one embodiment of the present invention.

In order to improve the read/write characteristics of the magnetic head of the present invention in which the <100> direction in the {110} plane of the $M_n$-$Z_n$ ferrite single crystal in the vicinity of the gap is selected as mentioned above, it is advisable to polish at least a portion of the side plane of the single crystal ferrite core member which is in the vicinity of the gap, or fuse, and deposit to the portion of the core member which is in the vicinity of the gap a glass 114 having a contraction rate which is lower than the ferrite when a temperaure is lowered from a glass setting temperature to a room temperature as shown in FIG. 11, or fuse and deposit such glass 114 after polishing. In this case, the single crystal $M_n$-$Z_n$ ferrite preferably has a crystalline magnetic anisotropy constant of $-2\times10^4 \sim 1\times10^4$ erg/cc and more preferably $-1.5\times10^4 \sim 8\times10^3$ erg/cc. The detail thereof is discussed in the Japanese Laid-Open Patent Applications Nos. 125519/80 and 96012/79. More desirable result is obtained by simultaneously using the fusing and deposition of the glass or the combination of the fusing and deposition of the glass and the polishing.

Figure 12:
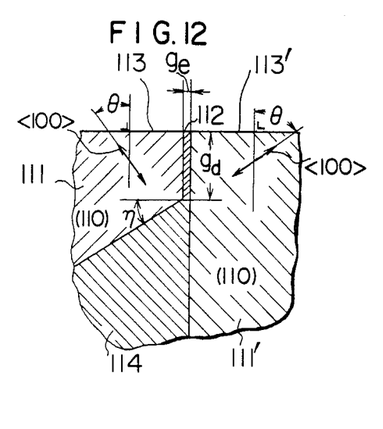
FIG. 12 shows a sectional view, in the vicinity of a gap, of the magnetic head shown in FIG. 11.

The portion in the vicinity of the gap is an area centered on a crossing line of the surface facing the magnetic recording medium and the plane defining the gap and having a radius of approximately gd to 10 gd, where gd is a depth of the plane defining the gap and shown in FIG. 12.

In the above explanation of the sliding direction of the magnetic recording medium, the description that the projection vector on the surface facing the magnetic recording medium, of the vector taken in the direction going from a site far from the surface facing the magnetic recording medium to a site near the surface in the <100> direction is anti-parallel to the sliding direction vector means that the magnetic core member having the angle θ or θ' of less than 90° is positioned behind in the direction of the relative movement of the magnetic recording medium and the magnetic core member having the angle θ or 74 ' of greater than 90° is positioned ahead in the direction of the relative movement of the magnetic recording medium.

The magnetic recording and reproducing apparatus of the present invention includes, in addition to the magnetic head and the means for moving the magnetic recording medium, those included in a conventional magnetic recording and reproducing apparatus such as an electronic circuit and magnetic head support means, which may be constructed in accordance with the existing art. The means for moving the magnetic recording medium may also be constructed in accordance with the existing art except that the sliding direction is specified as described above. Other than the magnetic head (excluding a coil) and the magnetic recording medium are omitted in the drawings.

The present invention is explained in further detail with reference to specific examples.

EXAMPLE 1

Figure 13:
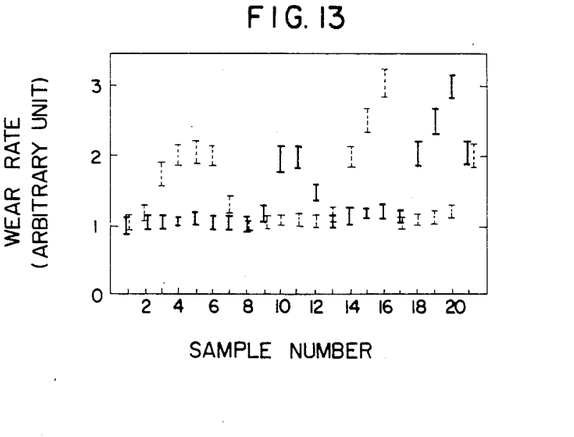
FIG. 13 shows a graph of measured wear rate of the magnetic head shown in FIG. 11.
Figure 14:
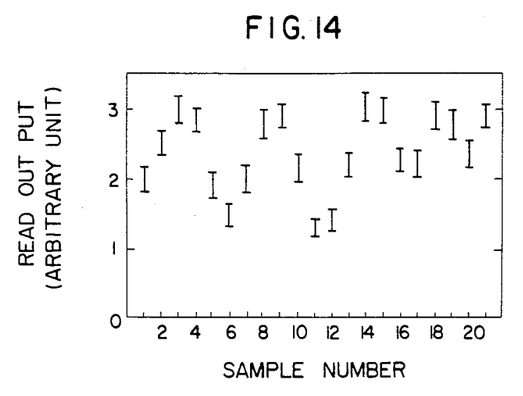
FIG. 14 shows a graph of measured read/write output of the magnetic head shown in FIG. 11.

A magnetic head as shown schematically in FIG. 11 was fabricated by a conventional method using $M_n$-$Z_n$ ferrite single crystal consisting of 54 mol % of $Fe_2O_3$, 27 mol% of MnO and 19 mol % of ZnO as the magnetic core material. FIG. 12 shows an enlarged sectional view in the vicinity of a gap. The magnetic core comprises an I-shaped core half 111' and a C-shaped core half 111 which are made of $M_n$-$Z_n$ ferrite single crystal and joined together with a gap 112 being interleaved therebetween. Portions of the core members in the vicinity of the gap are reduced in thickness to compare with the other portions of the core members and a recess is formed such that a track width $t_w$ is narrow than a core thickness $C_w$. A protecting glass 114 is filled in the recess. The dimensions of the magnetic head prepared and an angle of inclination η, which is shown in FIG. 12, of a track width defining portion of the C-shaped core are shown in Table 1. A contraction rate of the filling glass when it was cooled from a setting temperature to a room temperature was approximately $4\times10^{-3}$, which is slightly smaller than a thermal contraction rate of the $M_n$-$Z_n$ ferrite single crystal. The side planes of the C-shaped and I-shaped core halves were formed by {110} planes so that the plane forming the principal magnetic circuit was formed by the {110} plane, and the angles θ and θ' between the <100> directions in the {110} planes and the direction normal to the surface facing the magnetic recording medium were changed as shown in Table 2. The head samples thus fabricated were mounted on a rotary cylinder rotating at a relative speed of 5.8 m/s relative to a VTR (UHS type) magnetic type to measure wear rates and reproduced outputs for a 4 MHz recording signal. FIG. 13 shows measured wear rates and FIG. 14 shows measured outputs. In FIG. 13, the wear rates when the C-shaped core half was mounted ahead of the I-shaped core half (that is, when the C-shaped core half was positioned behind in the magnetic tape sliding direction) are shown by solid I marks, and the wear rates when the I-shaped core half was mounted ahead of the C-shaped core half (that is, when the C-shaped core is positioned ahead in the magnetic tape sliding direction) are shown by broken I marks.

TABLE 1

| h | 1.7 mm |
|---|--------|
| w | 2.3 mm |

TABLE 1-continued

| | | |
|---|---|---|
| $c_w$ | 140 | μm |
| $t_w$ | 30 | μm |
| $g_l$ | 0.5 | μm |
| $g_d$ | 50 | μm |
| l | 150 | μm |
| η | 30° | |

TABLE 2

| Sample No. | θ | θ' |
|---|---|---|
| No. 1 | 0° | 90° |
| No. 2 | 10° | 90° |
| No. 3 | 25° | 90° |
| No. 4 | 35° | 90° |
| No. 5 | 45° | 90° |
| No. 6 | 60° | 90° |
| No. 7 | 75° | 90° |
| No. 8 | 90° | 90° |
| No. 9 | 100° | 90° |
| No. 10 | 120° | 90° |
| No. 11 | 140° | 90° |
| No. 12 | 160° | 90° |
| No. 13 | 5° | 95° |
| No. 14 | 25° | 100° |
| No. 15 | 25° | 110° |
| No. 16 | 40° | 120° |
| No. 17 | 95° | 5° |
| No. 18 | 100° | 25° |
| No. 19 | 110° | 25° |
| No. 20 | 120° | 40° |
| No. 21 | 35° | 35° |

It is apparent from FIG. 13 that when the <100> directions in the planes forming the principal magnetic circuit are inclined to the surfaces 113 and 113' facing the magnetic recording medium, the wear rate is low if the projection vector in the sliding direction of the surfaces facing the magnetic recording medium, of the vector directed from a site far from the surface facing the magnetic recording medium to a site near the surface in the <100> direction is antiparallel to the sliding direction vector. The reproduced outputs of the magnetic heads (Nos. 2, 3, 4, 8, 9, 10, 13-21) whose angles θ and θ' are within the ranges of 5°-40° or 80°-120° are higher than those of other magnetic heads. It was confirmed that excellent read/write characteristics and high wear resistances were attained in the magnetic heads Nos. 13-16 in which the angles θ and θ' are set within the range of 5°-40° and 95°-120°, respectively, so that the <100> directions in the planes forming the principal magnetic circuit in the core halves are inclined to the surfaces facing the magnetic recording medium in the same direction, and the C-shaped core half is mounted on the rotary cylinder to be ahead of the other so that the projection vector on the surface facing the magnetic recording medium of the vector in the <100> direction directed from a site far from the surface facing the magnetic recording medium to a site near from said surface is anti-parallel to the sliding direction vector, and also in the magnetic heads Nos. 17-20 in which the angles θ and θ' are set within the ranges of 95°-120° and 5°-40°, respectively, so that the <100> directions in the planes forming the principal magnetic circuit in the core halves are inclined to the surfaces facing the magnetic recording medium in the same direction, and the I-shaped core half is mounted on the rotary cylinder to be ahead of the other so that the projection vector on the surface facing the magnetic recording medium of the vector in the <100> direction directed from a site far from the surface facing the magnetic recording medium to a site near from said surface is anti-parallel to the sliding direction vector. The superiority of the above magnetic heads are apparent from the comparison of the magnetic head No. 21 in which the angle θ and θ' are set to 35° and which is known to exhibit an excellent read/write characteristic and a relatively high wear resistance and the magnetic heads in which the angle θ is set to other than the above range and which exhibit worse read/write characteristic but exhibit high wear resistance. The present example relates to the magnetic head comprising the C-shaped core half and the I-shaped core half, but it is apparent that a similar effect is expected when the I-shaped core half is replaced by the C-shaped core half.

EXAMPLE 2

Figure 15:
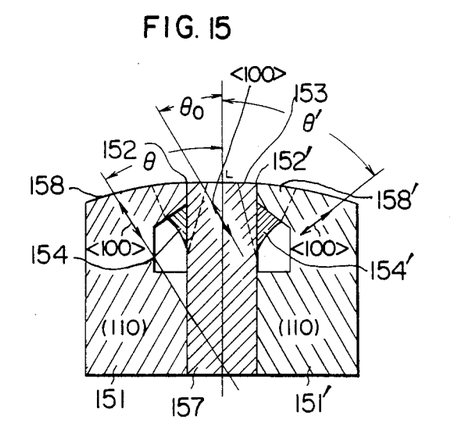
FIG. 15 shows a schematic sectional view of a magnetic head in other embodiment of the present invention.
Figure 16:
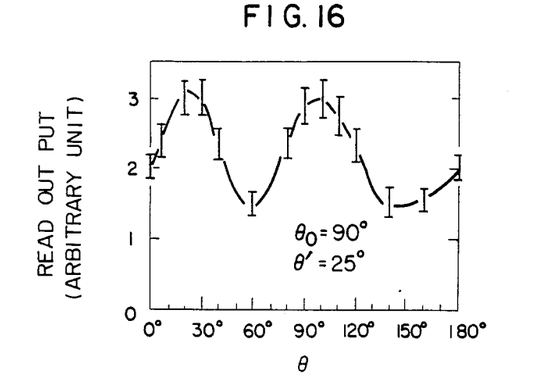
FIG. 16 shows a chart for illustrating the dependency of the read/write output of the magnetic head shown in FIG. 15 on the crystalline orientation.
Figure 17:
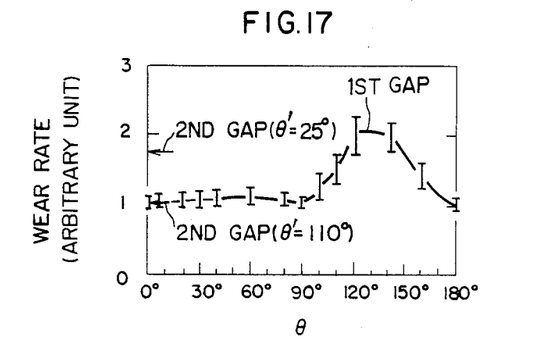
FIGS. 17 and 18 show charts for illustrating the dependency of the wear rate of a surface facing a magnetic recording medium of the magnetic head shown in FIG. 15 to the crystalline orientation.
Figure 18:
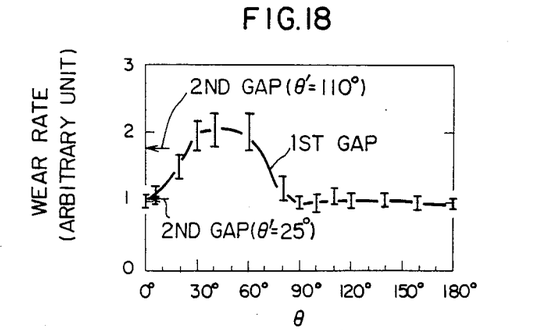

FIG. 15 shows a schematic sectional view of another embodiment of the magnetic head of the present invention, in which C-shaped core members 151 and 151' are joined to opposite sides of an I-shaped core member 157 with gaps 152 and 152' being interleaved therebetween. Recesses 158 and 158' are formed in the vicinity of the gaps as is the case of the Example 1 so that the track width is reduced to compare with the core thickness of other portions and protecting glasses 154 and 154' are filled in the recesses. Geometrical dimensions of the C-shaped cores are identical to those in the Example 1, and the dimensions of the I-shaped core are that the core width is 0.5 mm and the height and thickness are equal to those of the C-shaped core. The core material is a single crystal $M_n$-$Z_n$ ferrite similar to that used in the Example 1 and the material of the filling glasses 154 and 154' is also identical to that in the Example 1. The side planes of the core are formed by the {110} planes. The angles $θ_o$, θ and θ' between the <100> directions in the {110} plates in the I-shaped core member, the first C-shaped core member 151 and the second C-shaped core member 151' and the direction normal to the surface 153 facing the magnetic recording medium were varied to prepare various samples and then the wear rate in the vicinity of each gap portion and the read/write characteristic for each gap were measured in the same manner as the Example 1. FIG. 16 shows the dependency of the read/write characteristics on the angle when θ when $θ_o$ =90°, θ'=25° and θ was varied within the range of 0°-180°. It is seen that higher output is produced when the angle θ was limited within the range of 5°-40° or 80°-120°. The reproduced output at the second gap was substantially equal to the reproduced output at the first gap when θ'32 25 and θ=25 and to the reproduced output at the first gap when θ'=110° and θ=110°. FIGS. 17 and 18 shows the dependency of the wear rate in the vicinity of the first gap on the angle when the first C-shaped core was mounted ahead and the second C-shaped core was mounted ahead, respectively. The wear rates in the vicinity of the second gap when θ'=25° are also shown in the figures by arrows. It is seen that when θ' =25°, the angle θ is preferably selected to 90°-180° in order to attain the high wear resistance in the vicinity of the first and second gaps, and the angle is preferably selected to no greater than 120° in order to attain the excellent read/write characteristics. It is also seen that, when the angle θ' is 110°, it is preferable to select the angle θ to 0°-90° in order to attain the high wear resistance and it is preferable to select the angle θ to 5°-40° in order to attain the excellent read/write characteristics. The above results show that a magnetic head exhibiting the excellent read/write characteristics and high wear resistance is obtained by limiting the angle $\theta$ to the range of 5°–40° and the angle $\theta'$ to the range of 95°–120°, or the angle $\theta$ to the range of 95°–120° and the angle $\theta'$ to the range of 5°–40° and appropriately setting the direction of mounting. In the present embodiment, the angle $\theta_o$ of the I-shaped core member was set to 90°. The dependency of the read/write characteristic on the crystalline orientation in the I-shaped core is relatively gentle and it is rather preferable to select the crystalline orientation to assure the wear resistance. A high wear resistance is attained by selecting the surface 153 facing the magnetic recording medium to the {110} or {100} plane or similar plane, as is taught by the National Technical Report, Vol. 22, page 759. When the first C-shaped core 151 is mounted ahead, that is, when the angle is selected to the range of 5°–40° and angle $\theta'$ is selected to the range of 95°–120°, the high wear resistance is attained by setting the angle $\theta_o$ to the range of 0°–90°.

The sample No. 21 in the Example 1 has the same crystalline orientation as a prior art magnetic head which is known to exhibit relatively excellent read/write characteristic and high wear resistance. It is seen from the comparison therewith that the magnetic recording and reproducing apparatus of the present invention can improve the wear resistance by a factor of 1.5–2 while maintaining the substantially same read/write characteristics.

In the present embodiment, glasses of a specific contraction rate are fused and deposited to the portions of the side planes of the core members which are in the vicinity of the gaps, a similar effect is obtained when at least the portions of the side planes of the core members which are in the vicinity of the gaps are polished.

As is apparent from the foregoing description, according to the present invention, by using the $M_n$-$Z_n$ ferrite single crystal as the core member of the magnetic head and mounting the magnetic head having the crystalline orientation of the single crystal set to assure the excellent read/write characteristics on the magnetic recording and reproducing apparatus in the direction to assure the high wear resistance, the magnetic head is allowed to function as a magnetic head exhibiting the excellent read/write characteristic and the high wear resistance. Furthermore, according to the present invention, by appropriately selecting the crystalline orientation, in the magnetic head core, of the $M_n$-$Z_n$ ferrite single crystal used as the core member and selecting the direction of mounting of the magnetic head core, a magnetic head exhibiting the excellent read/write characteristic and the high wear resistance can be provided.

Obviously, many modifications and variations of the present invention are possible in the light of the above teachings. It is, therefore, to be understood that within the scope of the appended claims the invention may be practiced otherwise than as specifically described.

What is claimed is:

1. A magnetic recording and reproducing apparatus comprising:

a magnetic head having a plurality of core member facing each other with a gap being formed therebetween in a surface facing a magnetic recording medium, at least a portion of at least one of said magnetic core members which is in the vicinity of said gap being made of a $M_n$-$Z_n$ ferrite single crystal, a {110} plane of at least one $M_n$-$Z_n$ ferrite single crystal being substantially parallel to a plane forming a principal magnetic circuit, <100> directions contained in said {110} planes being inclined to said surface facing said magnetic recording medium; with the proviso that when a plurality of said ferrite single crystals have the inclined <100> directions, said <100> directions are inclined in the same directions; and means for relatively sliding said magnetic recording medium in opposite and parallel direction to a projection vector on said surface facing said recording medium, of a vector directed from a site far from said surface to a site near said surface is said <100> direction projected in the sliding direction of said magnetic recording medium in said surface facing said magnetic recording medium.

2. A magnetic recording and reproducing apparatus according to claim 1 wherein only one of said $M_n$-$Z_n$ ferrite single crystals has the {110} plane substantially parallel to said plane forming said principal magnetic circuit, and an angle $\theta$ between said <100> direction and a direction normal to said surface facing said magnetic recording medium is 5°–40°, 80°–85° or 95°–120°.

3. A magnetic recording and reproducing apparatus according to claim 2 wherein said angle $\theta$ is 10°–35° or 95°–115°.

4. A magnetic recording and reproducing apparatus according to claim 2 wherein said angle $\theta$ is 20°–30° or 95°–105°.

5. A magnetic recording and reproducing apparatus according to claim 2 wherein said angle $\theta$ is 25° or 100°.

6. A magnetic recording and reproducing apparatus according to any one of claims 2 to 5 wherein said magnetic core members facing each other with said gap being interleaved therebetween comprise an I-shaped core half and a C-shaped core half, at least portions of said I-shaped core half and said C-shaped core half which are in the vicinity of said gap being made of the $M_n$-$Z_n$ ferrite single crystal, {100} or {110} plane of the $M_n$-$Z_n$ ferrite single crystal of said I-shaped core half being substantially parallel to said surface facing said magnetic recording medium, a {110} plane of the $M_n$-$Z_n$ ferrite single crystal of said C-shaped core half being substantially parallel to said plane forming said principal magnetic circuit.

7. A magnetic recording and reproducing apparatus according to claim 1 wherein at least two of said ferrite single crystals have said {110} planes substantially parallel to said plane forming said principal magnetic circuit, and angles $\theta$ and $\theta'$ between said <100> directions and a direction normal to said surface facing said magnetic recording medium are 5°–40° or 80°–85° and 95°–120°, respectively.

8. A magnetic recording and reproducing apparatus according to claim 7 wherein said angles $\theta$ and $\theta'$ are 10°–35° and 95°–115°, respectively.

9. A magnetic recording and reproducing apparatus according to claim 7 wherein said angles $\theta$ and $\theta'$ are 20°–30° and 95°–105°, respectively.

10. A magnetic recording and reproducing apparatus according to claim 7 wherein said angles $\theta$ and $\theta'$ are 25° and 100°, respectively.

11. A magnetic recording and reproducing apparatus according to any one of claims 7 to 10 wherein said magnetic core members facing each other with said gap being interleaved therebetween comprise one I-shaped core member and two C-shaped core members, said C-shaped core members being joined to the opposite sides of said I-shaped core with said gap being interleaved therebetween, at least the portions of said C- shaped core members which are in the vicinity of said gap being made of $M_n$-$Z_n$ ferrite single crystal and {110} planes thereof being substantially parallel to said plane forming said principal magnetic circuit.

12. A magnetic recording and reproducing apparatus according to claim 11 wherein at least a portion of said I-shaped core member which is in the vicinity of said gap is made of $M_n$-$Z_n$ ferrite single crystal and a {100} plane or {110} plane thereof is substantially parallel to said surface facing said magnetic recording medium.

13. A magnetic recording and reproducing apparatus according to claim 11 wherein at least a portion of said I-shaped core member which is in the vicinity of said gap is made of $M_n$-$Z_n$ ferrite single crystal and a {110} plane thereof is substantially parallel to said plane forming said principal magnetic circuit and a <100> direction contained in said <110> plane is inclined to said surface facing said magnetic recording medium in the same direction as said C-shaped cores.

14. A magnetic recording and reproducing apparatus according to any one of claims 1–5 or 7–10 wherein glass having a contraction rate lower than that of ferrite when a temperature is lowered from a glass setting temperature to a room temperature is fused and deposited to portions of said magnetic core members which are in the vicinity of said gap.

15. A magnetic recording and reproducing apparatus according to any one of claims 1–5 or 7–10 wherein at least a portion of said core members which is in the vicinity of said gap is made of $M_n$-$Z_n$ ferrite single crystal and {110} plane thereof is substantially parallel to said plane forming said principal magnetic circuit and side planes of said magnetic core members have polished surfaces.

16. A magnetic recording and reproducing apparatus according to claim 1 wherein a plurality of said ferrite single crystals have the inclined <100> directions, with said <100> directions being inclined in the same direction.

* * * * *